(12) United States Patent
Lee et al.

(10) Patent No.: US 8,884,986 B2
(45) Date of Patent: Nov. 11, 2014

(54) METHOD AND TERMINAL FOR PROVIDING DIFFERENT IMAGE INFORMATION IN ACCORDANCE WITH THE ANGLE OF A TERMINAL, AND COMPUTER-READABLE RECORDING MEDIUM

(75) Inventors: Kyoung Suk Lee, Seoul (KR); Chan Jin Ju, Seoul (KR); Young Il Choi, Seoul (KR); Jung Hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 13/375,073

(22) PCT Filed: Sep. 6, 2010

(86) PCT No.: PCT/KR2010/006050
§ 371 (c)(1),
(2), (4) Date: Nov. 29, 2011

(87) PCT Pub. No.: WO2011/034307
PCT Pub. Date: Mar. 24, 2011

(65) Prior Publication Data
US 2012/0069052 A1 Mar. 22, 2012

(30) Foreign Application Priority Data
Sep. 21, 2009 (KR) ........................ 10-2009-0089287

(51) Int. Cl.
*G09G 5/00* (2006.01)
*G06F 1/16* (2006.01)

(52) U.S. Cl.
CPC ...... *G06F 1/1694* (2013.01); *G06F 2200/1637* (2013.01)
USPC ........... 345/629; 345/158; 345/173; 715/863; 715/864

(58) Field of Classification Search
CPC .......... G06F 1/1692; G06F 2200/1637; G06T 2207/20212
USPC .......... 345/629, 633, 632, 169, 158; 715/863, 715/864
See application file for complete search history.

(56) References Cited

U.S. PATENT DOCUMENTS 8,295,879 B2 * 10/2012 Alameh et al. ............. 455/556.1
2003/0078724 A1 * 4/2003 Kamikawa et al. ........... 701/208
(Continued)

FOREIGN PATENT DOCUMENTS

JP          2007206108 A  *  8/2007
KR   10-2006-0027180 A      3/2006
(Continued)

*Primary Examiner* — Michelle L Sams
(74) *Attorney, Agent, or Firm* — Blakely, Sokoloff, Taylor & Zafman LLP

(57) ABSTRACT

The present invention includes a method for providing different images by referring to angles of a terminal. The method includes the steps of: (a) if the angle falls under an angular range which includes 0 degree with respect to the horizontal plane, setting a content provided through the terminal to be map information, if the angle falls under an angular range which includes 90 degrees with respect to the horizontal plane, setting a content provided through the terminal to be preview image, and if the angle falls under an angular range which includes 180 degrees with respect to the horizontal plane, setting a content provided through the terminal to be weather; (b) acquiring information on the angle by using a sensor; (c) creating information on an image based on the set content; and (d) providing a user with the created information.

17 Claims, 7 Drawing Sheets

(56) References Cited

U.S. PATENT DOCUMENTS

| | | | |
|---|---|---|---|
| 2005/0222802 A1* | 10/2005 | Tamura et al. | 702/150 |
| 2006/0174203 A1* | 8/2006 | Jung et al. | 715/751 |
| 2006/0252547 A1* | 11/2006 | Mizrahi et al. | 463/42 |
| 2008/0071750 A1* | 3/2008 | Schloter | 707/3 |
| 2008/0088480 A1* | 4/2008 | Rozum et al. | 340/933 |
| 2009/0125234 A1* | 5/2009 | Geelen et al. | 701/209 |
| 2009/0225026 A1* | 9/2009 | Sheba | 345/156 |
| 2009/0262074 A1* | 10/2009 | Nasiri et al. | 345/158 |
| 2009/0289956 A1* | 11/2009 | Douris et al. | 345/633 |
| 2010/0077341 A1* | 3/2010 | Chen | 715/782 |

FOREIGN PATENT DOCUMENTS

| | | |
|---|---|---|
| KR | 2008-0093808 A | 10/2008 |
| KR | 10-2009-0070050 A | 7/2009 |

* cited by examiner

METHOD AND TERMINAL FOR PROVIDING DIFFERENT IMAGE INFORMATION IN ACCORDANCE WITH THE ANGLE OF A TERMINAL, AND COMPUTER-READABLE RECORDING MEDIUM

CROSS REFERENCE TO RELATED APPLICATIONS

This application is a U.S. National Phase Application of International Application PCT Application No. PCT/KR2010/006050 filed on Sep. 6, 2010, which claims the benefit of priority from Korean Patent Application No. 10-2009-0089287 filed on Sep. 21, 2009. The disclosures of International Application PCT Application No. PCT/KR2010/006050 and Korean Patent Application No. 10-2009-0089287 are incorporated herein by reference.

FIELD OF THE INVENTION

The present invention relates a method, a terminal and a computer-readable recording medium for providing different image information by angles of the terminal; and more particularly, to the method, the terminal and the computer-readable recording medium for providing different images, respectively, when a user looks down at the terminal, when the user looks forward thereat and when the user looks up from the down thereat and providing user interfaces to allow the user to control operations of the terminal in several forms if information on each image is provided.

BACKGROUND OF THE INVENTION

Recently thanks to the drastic development of telecommunication technologies, most people use mobile terminals such as mobile phones, PDAs, mobile televisions, etc. and the dependence on such mobile terminals is on increase.

Accordingly, the needs and desires of modern people who intend to obtain various kinds of information through such mobile terminals are increasing every day and content providers intend to enhance content usage by providing users with information on various forms of contents and then triggering their interest.

But present mobile terminals provide only limited information for the users. For example, mobile phones offer only one content to users during a waiting time when the users do not make phone calls or send SMS messages. To receive a different type of content, users have to stop displaying the pre-provided content and perform an operation to get different content.

Furthermore, conventional mobile phones almost disable users to join social activities with specific or unspecific other users except phone calling or SMS messaging and they are almost impossible to create a community for sharing certain information or exchanging opinions.

To improve such environment, technologies capable of controlling images by movements or angular positions of mobile terminals recently have been developed.

However, technologies only for controlling a move of a cursor or a specific object displayed on a screen according to movements or angular positions of the mobile terminals have been developed but methods for providing various information or user interfaces based on the above-mentioned technologies have not been developed.

Accordingly, the development of new technology which might provide various types of information for users by offering different images depending on tilts of a terminal to a reference plane and at the same time give user interfaces to control terminal operations is an urgent need.

SUMMARY OF THE INVENTION

It is an object of the present invention to solve all the problems mentioned above.

It is another object of the present invention to allow users to get various types of information by providing different images depending on various angles of a terminal leaning to a horizontal plane or a certain reference plane.

It is still another object of the present invention to allow a user to input a motion easily and at the same time to take an interest in the inputted motion by making the user capable of controlling images by a prefixed motion, e.g., shaking or turning of the terminal, when different images are provided depending on various angles of the terminal.

It is yet another object of the present invention to lead active opinion expression and mutual exchange, instead of acquisition of unilaterally provided information, by allowing the user to check other users' instant memos, etc. as well as to exchange opinions with other users through information on the images depending on different angles of the terminal.

In accordance with one aspect of the present invention, there is provided a method for providing different images by referring to angles of a terminal including the steps of: (a) on assumption that if an angle of the terminal leaning to a horizontal plane or a certain reference plane is 0 degree, a screen of the terminal is deemed to face toward the ground, (i) if the angle of the terminal leaning to the horizontal plane or the certain reference plane falls under an angular range which includes 0 degree with respect to the horizontal plane or the certain reference plane, setting a content provided through the terminal to be relevant to map information, (ii) if the angle thereof leaning to the horizontal plane or the certain reference plane falls under an angular range which includes 90 degrees with respect to the horizontal plane or the certain reference plane, setting a content provided through the terminal to be relevant to preview image, and (iii) if the angle thereof leaning to the horizontal plane or the certain reference plane falls under an angular range which includes 180 degrees with respect to the horizontal plane or the certain reference plane, setting a content provided through the terminal to be relevant to weather; (b) acquiring information on the angle of the terminal tilted with respect to the horizontal plane or the certain reference plane by using a sensor(s); (c) creating information on an image based on the set content corresponding to the acquired information on an angle of the terminal; and (d) providing a user with the created information on the image.

In accordance with another aspect of the present invention, there is provided a terminal for providing information on different images by referring to angles thereof including: a sensor for acquiring information on an angle thereof with respect to a horizontal plane or a certain reference plane; a control part for creating information on an image based on the set content corresponding to the information on the angle thereof if the information on the angle thereof is acquired through the sensor, in a state of a content provided therethrough (i) being set to be relevant to map information if an angle thereof leaning to the horizontal plane or a certain reference plane falls under an angular range which includes 0 degree with respect to the horizontal plane or the certain reference plane, (ii) being set to be relevant to a preview image if the angle thereof leaning to the horizontal plane or the certain reference plane falls under an angular range which includes 90 degrees with respect to the horizontal plane or the certain reference plane, and (iii) being set to be relevant to weather if the angle thereof leaning to the horizontal plane or the certain reference plane falls under an angular range which includes 180 degrees with respect to the horizontal plane or the certain reference plane, provided that it is assumed that if the angle thereof leaning to the horizontal plane or the certain reference plane is 0 degree a screen of the terminal is deemed to face toward the ground; and a display part for providing a user with the created information on the image.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the present invention may be practiced. These embodiments are described in sufficient detail to enable those skilled in the art to practice the present invention. It is to be understood that the various embodiments of the present invention, although different from one another, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled.

For reference, changes in angles of a terminal 100 in the present invention may be a concept including not only changes in angular positions thereof around an axis but also those around unfixed axis.

Configuration of Terminal

Figure 1:
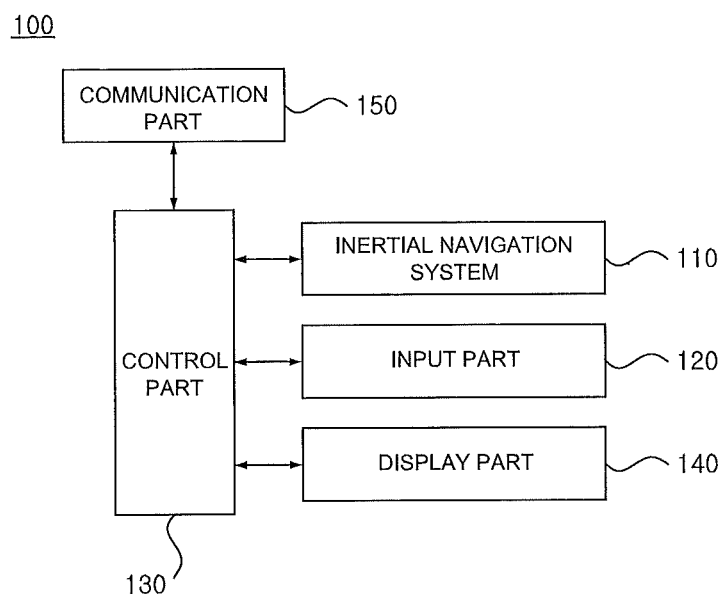
FIG. 1 illustrates a brief configuration of a terminal for providing information on different images depending on different angles of the terminal to which a user looks in accordance with one example embodiment of the present invention.

FIG. 1 illustrates a brief configuration of a terminal to provide information on different images depending on different angles of the terminal to which a user looks in accordance with one example embodiment of the present invention.

As illustrated in FIG. 1, a terminal 100 in the present invention may include an inertial navigation system 110 for sensing information on a movement such as changes in angles of the terminal 100, an input part 120 for receiving the user's input, a control part 130 for generating information on images based on the information sensed by the inertial navigation system 110 and the information received by the input part 120, a display part 140 for providing the user with the information on images generated by the control part 130 and a communication part 150.

In accordance with one example embodiment of the present invention, the inertial navigation system 110, the input part 120, the control part 130, the display part 140 and the communication part 150 may be program modules communicating with the terminal 100. Such program modules may be included in the terminal 100 in a form of an operating system, an application program module and other program modules, or they may be physically stored in various storage devices well known to those skilled in the art or in a remote storage device capable of communicating with the terminal 100. The program modules may include but not be subject to a routine, a subroutine, a program, an object, a component, and a data structure for executing a specific operation or a type of specific abstract data that will be described in accordance with the present invention.

By referring to FIG. 2, the configuration and functions of the inertial navigation system 110 in accordance with one example embodiment of the present invention are described in detail below. However, the present invention mentions, as one example, the inertial navigation system 110 to acquire information on an angle of the terminal 100, but it is not limited only to this and if it is possible to acquire information on the angle thereof by using a sensor, this will be able to be included in the scope of the present invention.

Figure 2:
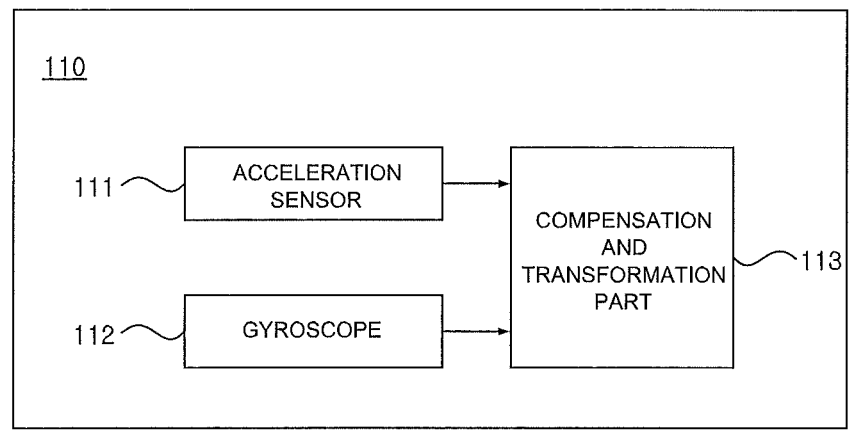
FIG. 2 is a drawing presenting an internal configuration of an inertial navigation system 110 in accordance with one example embodiment of the present invention.

As shown in FIG. 2, the inertial navigation system 110 in the present invention may include one or more acceleration sensors 111, one or more gyroscopes 112 and a compensation and transformation part 113.

The inertial navigation system 110 may perform a function of getting information on linear movement, rotating movement, shaking, etc. of the terminal 100 based on acceleration measured by using a variety of sensors therein. The acceleration sensor(s) 111 is a sensor which senses a movement of the terminal 100, measures acceleration thereof, and detects information on shaking velocity, shaking intensity, and shaking direction thereof.

Furthermore, the gyroscope(s) 112 may perform a function of measuring degree of the movement of the terminal 100 by sensing rotation thereof. The acceleration sensor (s) 111 may express the values of sensed acceleration as a vector in three axes (the X, Y and Z axes) and the gyroscope (s) 112 may express the values of sensed rotation as another vector in three axes (i.e., roll, pitch and yaw). Embedded with the acceleration sensor(s) 111 and the gyroscope(s) 112, the inertial navigation system 110 may calculate velocity and position of the terminal and changes in the velocity and the position. The inertial navigation system 110 may be a normal inertial navigation system (INS) and the gyroscope(s) 112 may include optic gyroscope(s), mechanical one(s), piezoelectric one(s), etc.

The compensation and transformation part 113 may perform a function of converting analog signal outputted from the acceleration sensor(s) 111 and the gyroscope(s) 112 to analog and/or digital signal. Moreover, it may conduct a function of converting to information on movements, angles, and shaking by integrating the converted signal and tracing its path.

The information on the movements, angles, and shaking of the terminal 100 outputted from the inertial navigation system 110 may be updated for a certain period of time or in real time and be transferred to the control part 130.

In accordance with one example embodiment of the present invention, the input part 120 may conduct a function of receiving an input signal inputted by the user, processing it and then transferring it to the control part 130. The input part 120 in accordance with one example embodiment of the present invention may be implemented in a general form of touch screen.

Below is a brief explanation on the operations of the input part 120 which is implemented in a form of touch screen. First of all, when a user interface containing buttons displaying several functions, a keypad for inputting various data or selectable images regarding a specific location is displayed on the display part 140, the user may perform an input gesture by touching a specific location of the user interface by using a tool (e.g., a stylus pen, the user's fingertip, etc.). The touch may cause a certain tactile sensor embedded in the input part 120 to sense the above-mentioned touch and create electric signal related thereto. The input part 120 may receive the input signal from the user, generate information related thereto and transfer the information to the control part 130.

By referring to FIG. 3, the control part 130 which processes the information on the output from the inertial navigation system 110 and creates information on images to be displayed through the display part 140 is explained below.

Figure 3:
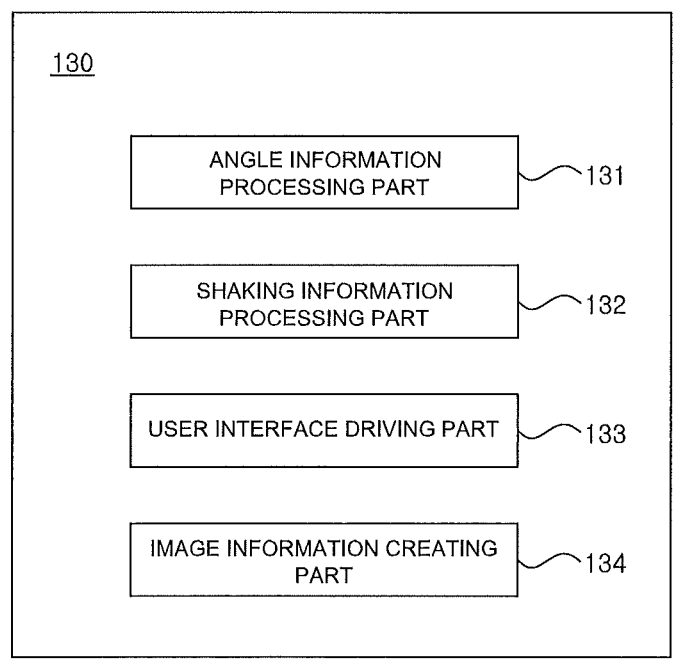
FIG. 3 shows an internal configuration of a control part 130 in accordance with one example embodiment of the present invention.

As illustrated in FIG. 3, the control part 130 may include an angle information processing part 131, a shaking information processing part 132, a user interface driving part 133, and an image information creating part 134.

The angle information processing part 131 may perform a function of processing information on an angle of the terminal 100 acquired by the inertial navigation system 110 to thereby create information on an image(s) related thereto. More specifically, the angle information processing part 131 may conduct a function of measuring a current angle of the terminal based on the information provided by the inertial navigation system 110.

As explained in detail below, the terminal 100 in the present invention may provide the user with different images through a screen thereof according to three different ranges of angle. For this, the angle information processing part 131 may carry out a function of measuring the angle of the terminal 100. The information on the angle of the terminal 100 may be information on an angle of the terminal 100 leaning to an absolute reference plane. In other words, after initializing the absolute reference plane as a horizontal plane or a certain reference plane, the angle information processing part 131 may measure the current angle of the terminal 100 leaning to the absolute reference plane based on the information from the inertial navigation system 110. Besides, the information on an angle of the terminal 100 may be information on a relative tilt. That is to say, the angle information processing part 131 may set an initial state of a motion (e.g., an initial state of which the terminal 100's power is on) as a relative reference plane and measure the current angle of the terminal 100 leaning thereto. The information on an angle of the terminal 100 measured by the angle information processing part 131 may have a range of, e.g., −180° to +180° or 0° to 360°. Furthermore, the information on the angle of the terminal 100 may be expressed as a specific range of angle among n ranges of angle. For example, if the value of n is 3, the range of the angle of the terminal 100 leaning to the horizontal plane is between −45° and +45° may be expressed as Section A; that of the angle thereof is between +135° and +225° as Section B; and the other range excluding Sections A and B as Section C. As explained further below, the angle information processing part 131 in accordance with one example embodiment of the present invention may express the range of the angle of the terminal 100 leaning to the reference plane in three sections because three different types of images may be provided depending on the tilts of the terminal 100 to the horizontal plane.

Next, the shaking information processing part 132 in accordance with one example embodiment of the present invention may perform a function of identifying the user's gesture inputted through vibration based on the information on the shaking of the terminal 100 (information on shaking velocity, intensity, direction, etc.) sensed by the acceleration sensor. Herein, it is not limited only to information on the shaking and it will be extended to the information on the same or similar scope. In short, the user may input a command to control an operation of the terminal 100 not only through the input part 120 but also by shaking the terminal 100. To do this, the shaking information processing part 132 may identify shaking, shaking intensity, shaking direction, etc. of the terminal 100.

In accordance with one example embodiment of the present invention, the user interface driving part 133 may carry out a function of providing the user with a user interface through the display part 140 and controlling the user interface. The user may make an input to control an operation of the terminal 100 through the user interface provided by the user interface driving part 133 and manipulate the terminal 100 to perform an operation the user wants or provide information the user wants according to the user's input. The user interface provided by the user interface driving part 133 and its operations will be made clear in detail.

In accordance with one example embodiment of the present invention, the image information creating part 134 may perform a function of creating an image to be provided to the user through the display part 140 based on the information acquired by the angle information processing part 131 and the shaking information processing part 132. At the time, the user interface provided by the user interface driving part 133 may be also included on the image. An image created by the image created by the image information creating part 134 may be an image acquired from the information pre-stored on a separate database (not illustrated) or an image acquired from information received in real time. On assumption that an appropriate image is created based on information on an angle of the terminal 100 measured by the angle information processing part 131, a database may include information on tilts of the terminal 100 and information on the corresponding content types related thereto (e.g., if a tilt of the terminal 100 is included in Section A, a content with a type A is provided, if the tilt thereof is included in Section B, a content with a type B is provided and if the tilt thereof is included in Section C, a content with a type C is provided). The image information creating part 134 may create information on an image by combining a content with a specific type corresponding to a tilt of the terminal 100 with other contents. Herein, it may also create information on an image by combining a specific image, e.g., a preview image, provided through the terminal 100 according to an angle of the terminal leaning to a reference plane with additional information relevant to the specific image by using a technology of augmented reality (AR).

Herein, if ranges of angle of the terminal 100 leaning to the horizontal plane are divided by n sections, each content with a different type will be allowed to correspond to each of n sections and if the angle of the terminal 100 is included in a particular section among the n sections and a content with a specific type corresponds to the particular section, the terminal 100 will be able to create information on an appropriate image based on the specific type.

In accordance with one example embodiment of the present invention, the display part 140 may perform a function of processing the image created by the image information creating part 134 in the control part 130 to thereby provide it visually for the user. The display part 140 may include a liquid crystal display (LCD), an organic light emitting diode (OLED) or other flat panel display.

In accordance with one example embodiment of the present invention, the communication part 150 may conduct a function of receiving and transmitting different types of information and content from a server (not illustrated). Namely, the communication part 150 may perform a function of receiving and transmitting data from or/and to the terminal 100 as a whole.

Below is an explanation of the operations of the terminal 100 in accordance with one example embodiment of the present invention by referring to detailed example embodiments.

Example Embodiments

As described above, the terminal 100 in accordance with one example embodiment of the present invention may be allowed to provide information on different images (including a user interface) depending on various angles of the terminal 100 leaning to a reference plane.

Figure 4A:
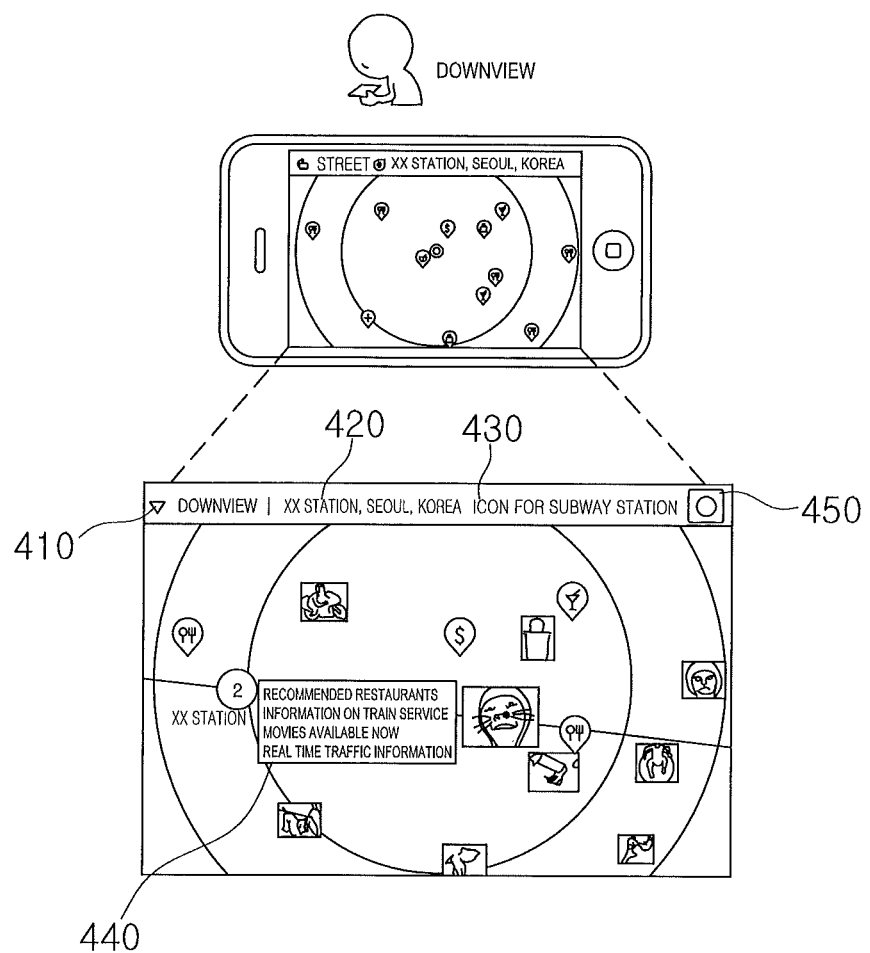
FIGS. 4A to 4C exemplarily illustrate examples of information on different images provided depending on tilts of the terminal in accordance with one example embodiment of the present invention.
Figure 4B:
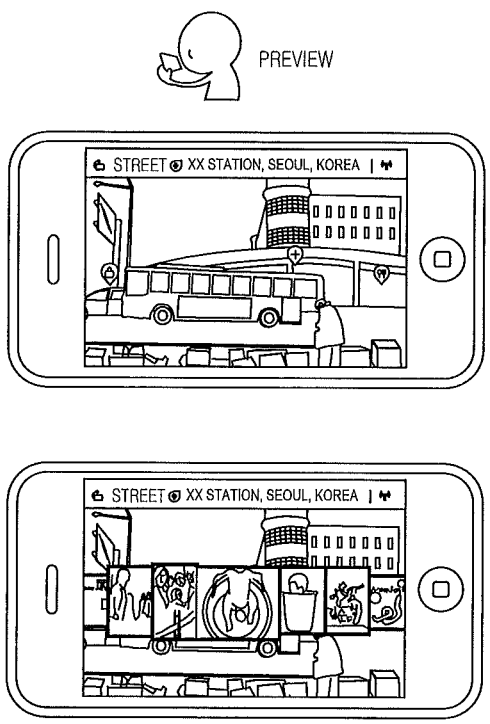
Figure 4C:
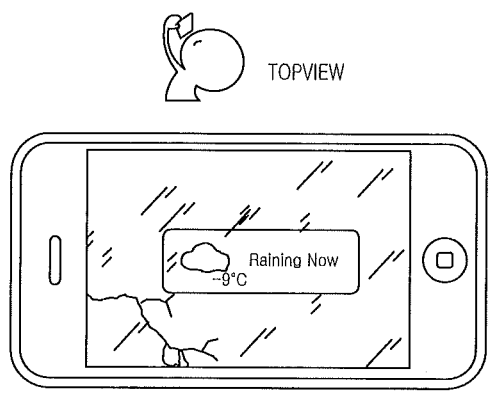

FIGS. 4A to 4C illustrate examples of different images displayed through a screen of a terminal 100 depending on tilts of the terminal 100 in accordance with the present invention.

First, FIG. 4A shows an image provided if the terminal 100 has no tilt or a very small tilt to a reference plane. In other words, FIG. 4A shows an image provided in case the user looks down at the display part 140 of the terminal 100 (i.e., a so-called downview). In accordance with the present invention, the image of FIG. 4A, i.e., the image provided when the user looks down at the terminal 100, is called "a downview image". No tilt to the reference plane herein means not only a case in which an angle of the terminal leaning to the reference plane is 0 degree but also a case in which an angle thereof leaning to the reference plane is not exceeding a pre-set value. For an instance, if the terminal 100 has a tilt between −45° and +45° with respect to the reference plane, a downview image as shown in FIG. 4A will be provided.

In accordance with one example embodiment of the present invention, an image relating to geographic information as a downview image may be offered. In particular, information on a geographic location where the terminal 100 is now located may be provided. As illustrated in FIG. 4A, the image may be a map. In detail, the user may enlarge or shrink the size of the map by a gesture inputted through the input part 120 or move a portion of the map which is displayed through a screen of the terminal 100. The gesture for enlarging or shrinking the map may be inputted through the user interface on the display part 140. For example, the user may touch two specified parts of the map and input the gesture to enlarge or shrink some parts thereof. Further, by touching a specified part of the map and then dragging it, the user may move the portion of the map which is displayed through the screen. FIG. 4A is a downview image which illustrates an image relating to geographic information but it is not limited only to this and it, in fact, will be able to get and provide a preview image inputted through the screen of the terminal 100 and also will be able to provide the image by overlaying the map on the preview image in a form of augmented reality.

The user interface provided on the display part 140 of the terminal 100 may include an icon such as a toggle button 410, which may perform a function of locking. That is, if the user clicks the toggle button 410 while the downview image is provided, the downview image will be provided continuously even though the angle of the terminal 100 becomes changed. The toggle button 410 may be included even in the user interfaces illustrated in FIGS. 4B and 4C but the explanation thereabout will be omitted below.

Figure 5:
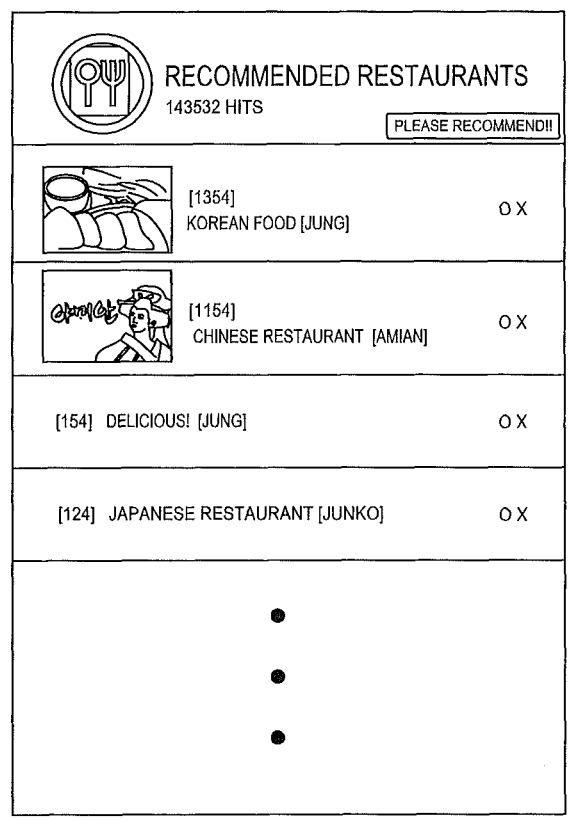
FIG. 5 is a drawing presenting a user interface provided if the user performs a specific motion on the state that the information of the image is illustrated on FIG. 4A.

On the other hand, as shown in FIG. 4A, the image provided on the display part 140 may be an image relating to geographic information on an area around a metro station, information of interest near the metro station, etc. In the case, a window displaying the user's present location 420 may be included on the image. Besides, a button for displaying subway lines 430 may be included. If the user clicks the button 430, all subway lines existing on the city where the user is located will be able to be displayed. If multiple subway lines are displayed, the user will be able to select one line and then information on a route of the selected line will be displayed in detail. If the user selects a subway station, the user may selectively receive information around the subway station through an additionally provided selection window 440. If the user selects one or more menus in the selection window 440 herein, another user interface may be additionally provided. For instance, suppose the user selected "Recommended Restaurants" among 4 menus, i.e., "Recommended Restaurants", "Information on Train Service", "Movies Available Now" and "Real Time Traffic Information", a user interface as shown in FIG. 5 will be additionally provided. Using the user interface, information on good restaurants around the subway station pre-retrieved by users may be offered in detail. The information on good restaurants may include recommendation hits or comments of users by respective restaurants. Besides, the user may recommend a new good restaurant by clicking a "Recommend Restaurant" button and may express whether the user agrees or disagrees on a comment entered by another user or whether the user recommends a restaurant which was recommended by another user. If a comment exceeds n recommendations, restaurants with the comment will be able to come together as a group(s) and the comment will be able to be posted by restaurant (e.g., it will be possible to provide the user with a user interface on which the user may post a comment by restaurant after one or more good restaurants with n or more recommendation hits are grouped). If the recommendation hits exceed n, [restaurant tag]+restaurant information (introduction, menu and location) may be registered in a database and accordingly [restaurant tag] will become clickable by collective intelligence. For reference, the aforementioned case is an example of grouping restaurants based on recommendation hits thereabout, but an example of grouping famous sites in the area based on users' recommendation hits will be also included.

In the image provided through the terminal 100, a shooting mode selection button 450 may be included. By clicking the button 450, the user may stop a mode of receiving an image to convert to a shooting mode and additionally use the shooting mode while continuously receiving the current image.

Next, FIG. 4B represents an image provided if the terminal 100 has a tilt of 90 degrees to the reference plane. Briefly, FIG. 4B shows an image provided in case the user looks forward at the display part 140 of the terminal 100 (i.e., a so-called preview). In accordance with the present invention, the image of FIG. 4B, i.e., the image provided when the user looks forward at the terminal 100, is called "a preview image". Having a tilt of 90 degrees to the reference plane herein means not only a case in which an angle of the terminal leaning to the reference plane is 90 degrees but also a case in which an angle thereof leaning to a certain plain perpendicular to the reference plane is not exceeding a pre-set value. For an instance, if the terminal 100 has a tilt between +45° and +135° or between +225° and +315° with respect to the reference plane, a preview image as shown in FIG. 4B will be provided.

The preview image may be a different type of information from the downview image. For example, the preview image, as illustrated in FIG. 4B, may be a landscape shown through the screen of the terminal 100 before a photo or video is shot. Certain icons or contents will be able to be provided by being overlaid on the landscape in a form of augmented reality. At the time, the user may control the operations of the terminal 100 in several forms. For instance, the user may control the provided preview image by a gesture of shaking the terminal 100.

This may be implemented in various forms: if the user performs a gesture of shaking once, multiple thumbnails relating to the current location may be displayed in a line in the order closer to the current location; if the user conducts a gesture of shaking twice, multiple thumbnails may be sorted and displayed in the popularity order as shown in the lower image of FIG. 4B; and if the user conducts a gesture of shaking three times, the thumbnails may disappear from the current screen. In short, if a landscape of the current location where the user of the terminal 100 is located is displayed through the screen of the terminal 100, the sort order, pattern or the like of the thumbnails falling under information of interest relating to the current location may be variable according to shaking patterns of the terminal 100. However, it is not limited only to this and it will be able to reproduce the present invention by applying various examples. Such shaking gestures may be sensed by the acceleration sensor 111 of the inertial navigation system 110 and the sensed information may be processed by a shaking gesture processing part 132 of the control part 130.

Finally, FIG. 4C represents an image provided if the terminal 100 has a tilt of 180 degrees to the reference plane. That is, FIG. 4C shows an image provided in case the user looks up at the display part 140 of the terminal 100 (i.e., a so-called topview). In accordance with the present invention, the image of FIG. 4C, i.e., the image provided when the user looks up at the terminal 100, is called "a topview image". Having a tilt of 180 degrees to the reference plane herein means not only a case in which an angle of the terminal leaning to the reference plane is 180 degrees but also a case in which an angle thereof leaning to a certain plain parallel to but the direction thereof is opposite to the reference plane is not exceeding a pre-set value. For an instance, if the terminal 100 has a tilt between +135° and +225° or between −45° and +45° with respect to the reference plane, a topview image as shown in FIG. 4C will be provided.

As well, the topview image may be a different type of image from the downview image and the preview image. For example, as depicted in FIG. 4C, the topview image may be an image relating to weather information, which may be an image bringing a visual effect by being implemented with motion graphics technology. On the topview image, content information, including messages inputted by other users, may be further provided. For instance, it will be possible for the user to share messages inputted by other users by providing the messages floating on the screen of the terminal 100 in a form of augmented reality. If a specific user inputs a message through a user interface, the inputted message will be transmitted through the communication part 150 to a server (not illustrated), which may deliver the message to respective terminals 100 of respective users who belong to a group selected by the specific user or any other groups but it is not limited only to this. In addition, useful information such as news and shopping as well as the message inputted by the specific user will be able to be further included. Such information may be displayed in a form of flowing stream in a particular direction on the display part 140 but it is not limited only to this.

Herein, it was exemplified that the downview image, a preview image and the topview image are displaying different types of information and user interfaces included therein are also different. More specifically, as the user takes a stance looking down to the ground, map information, etc. which is relevant to the ground will be provided as the downview image; as the user takes the stance looking forward, a landscape will be provided as the preview image; and since the user takes the stance looking upward, weather information, etc. which is relevant to the sky will be provided as the topview image. By dynamically providing appropriate images depending on a direction to which the screen of the terminal is at a right place at a right time, this will be able to draw the interest and awareness of users.

The examples of tilting the terminal 100 upwards and downwards were mainly explained above but they are not only limited to this. Respectively, at the downview image mode, the preview image mode and the topview image mode, it will be possible to provide different types of information depending on vertical or horizontal screens in case the terminal 100 is turned vertically or horizontally. For example, if the terminal 100 is turned horizontally at the preview image mode, a normal street landscape will be inputted and provided and if the terminal 100 is turned vertically, image matching for the image inputted through the terminal 100 will be performed and the information on the recognized image will be provided, wherein the concepts of "vertically" and "horizontally" are not necessary to be determined based on the absolute horizontal plane but may be determined based on a relative plane.

In accordance with the present invention, information on different images may be provided depending on view directions of a terminal to which a user looks, i.e., when the user looks down at the terminal, when the user looks forward thereat and when the user looks up from the down thereat and therefore the user may obtain various information without any separate inputted motions by changing the directions of the terminal to which the user looks.

In accordance with the present invention, the user, in addition, may feel easiness to use and interest in controlling information on images because the user can do so only by producing a motion of shaking the terminal or other similar motions.

In accordance with the present invention, the user may actively express an opinion and engage in social intercourse with other users through the terminal because the user may check other users' opinions and so on in real time and enter the user's own opinion through a variety of user interfaces included in the information on images.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for providing different images by referring to angles of a terminal comprising the steps of:
   setting content provided through the terminal to be relevant to the following:
   map information when the terminal is tilted within an angular range which includes a 0 degree horizontal plane or another reference plane in which a display screen of the terminal faces generally upward, a preview image when the terminal is tilted within an angular range which includes 90 degrees from the 0 degree horizontal plane, and weather information when the terminal is tilted within an angular range which includes 180 degrees from the 0 degree horizontal plane;
   acquiring information on the angle of the terminal tilted with respect to the horizontal plane or the certain reference plane by using a sensor(s);
   creating information on an image by:
      generating a first image based on information acquired via a remote database when the angle of the terminal indicates a first type of tilt;
      combining the first image with first information relevant to the first image;
      generating a second image when the angle of the terminal indicates a second type of tilt; and
      combining the second image with second information relevant to the second image; and
   providing a user with the created information on the image.

2. The method of claim 1, wherein, the angle of the terminal is included in a specific angular range among the three angular ranges, the information on the image is created differently depending on whether the terminal is placed in portrait or landscape position in the specific angular range.

3. The method of claim 1, wherein the map information includes geographic information about a nearby area around a current location of the terminal and information of interest thereabout.

4. The method of claim 3, wherein the information of interest includes at least one of recommended famous sites, train service, movies available now and real time traffic as information relating to the nearby area.

5. The method of claim 4, wherein the step of computing the total of recommendation hits of users by each recommended famous site and the step of providing a user interface with which comments are posted by each certain recommended famous site having k or more recommendation hits grouped among the recommend famous sites, are included.

6. The method of claim 1, wherein, the angle of the terminal is changed, the created information on the image includes an icon for preventing the image currently provided from being converted to a different image.

7. The method of claim 1, wherein, the angle of the terminal is within an angular range which includes 90 degrees from the 0 degree horizontal plane or other reference plane, a step of sensing shaking of the terminal and a step of changing sorts of thumbnails including information relating to a specified area depending on a pattern of the shaking of the terminal if a landscape of the specified area is displayed as a preview are further included.

8. The method of claim 1, wherein, the angle of the terminal is within an angular range which includes 180 degrees from the 0 degree horizontal plane or other reference plane, comments inputted by users are additionally displayed in a form of flowing stream on the screen of the terminal.

9. A terminal for providing information on different images by referring to angles thereof comprising:
   a sensor for acquiring information on an angle thereof with respect to a horizontal plane or a certain reference plane;
   a control part for creating information on an image based on the set content corresponding to the information on the angle thereof when the information on the angle thereof is acquired through the sensor, in a state of a content provided therethrough being set to be relevant to map information when an angle thereof leaning to the horizontal plane or a certain reference plane falls under an angular range which includes 0 degree with respect to the horizontal plane or the certain reference plane, being set to be relevant to a preview image when the angle thereof leaning to the horizontal plane or the certain reference plane falls under an angular range which includes 90 degrees with respect to the horizontal plane or the certain reference plane, and being set to be relevant to weather when the angle thereof leaning to the horizontal plane or the certain reference plane falls under an angular range which includes 180 degrees with respect to the horizontal plane or the certain reference plane, provided that it is assumed that if the angle thereof leaning to the horizontal plane or the certain reference plane is 0 degree a screen of the terminal is deemed to face toward the ground; and wherein the information is created by generating a first image based on information acquired via a remote database when the angle of the terminal indicates a first type of tilt, combining the first image with first information relevant to the first image and generating a second image when the angle of the terminal indicates a second type of tilt and combining the second image with second information relevant to the second image; and
   a display part for providing a user with the created information on the image.

10. The terminal of claim 9, wherein, when the angle thereof is included in a specific angular range among the three angular ranges, the control part creates the information on images differently depending on whether the terminal is placed vertically or horizontally in the specific angular range.

11. The terminal of claim 9, wherein the map information includes geographic information about a nearby area around a current location thereof and information of interest thereabout.

12. The terminal of claim 11, wherein the information of interest includes at least one of recommended famous sites, train service, movies available now and real time traffic as information relating to the nearby area.

13. The terminal of claim 12, wherein the control part includes a user interface driving part which computes the total of recommendation hits of users by each recommended famous site and provides a user interface with which comments are posted by each certain recommended famous site having k or more recommendation hits grouped among the recommend famous sites.

14. The terminal of claim 9, wherein, the angle thereof is changed, the created information on the image includes an icon for preventing the image currently provided from being converted to a different image.

15. The terminal of claim 9, wherein, when the angle thereof is within an angular range which includes 90 degrees from the 0 degree horizontal plane or other reference plane, the sensor senses shaking thereof and changes sorts of thumbnails including information relating to a specified area depending on a pattern of the shaking thereof if a landscape of the specified area is displayed as a preview.

16. The terminal of claim 9, wherein, when the angle thereof is within an angular range which includes 180 degrees from the 0 degree horizontal plane or other reference plane, the control part creates information on the image to additionally display comments inputted by users in a form of flowing stream on the screen thereof.

17. A non-transitory computer readable medium having recorded thereon a computer readable program to execute the method of claim 1.

* * * * *